(12) United States Patent
McKnight et al.

(10) Patent No.: US 7,032,178 B1
(45) Date of Patent: Apr. 18, 2006

(54) TAGGING CONTENT FOR DIFFERENT ACTIVITIES

(75) Inventors: Russell F. McKnight, Sioux City, IA (US); Glen J. Anderson, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 578 days.

(21) Appl. No.: 09/821,905

(22) Filed: Mar. 30, 2001

(51) Int. Cl.
*G06F 3/00* (2006.01)
*G06F 15/00* (2006.01)

(52) U.S. Cl. ............... 715/747; 715/716; 715/727; 715/744; 715/765; 715/866; 715/512; 345/156

(58) Field of Classification Search ............... 345/700, 345/156, 716, 717, 727, 744, 745, 747, 764, 345/765, 866, 963; 715/512, 700, 716, 717, 715/727, 744, 745, 747, 764, 765, 866, 963, 715/156
See application file for complete search history.

(56) References Cited

U.S. PATENT DOCUMENTS

| | | | |
|---|---|---|---|
| 5,592,511 A | 1/1997 | Schoen et al. | 375/220 |
| 5,616,876 A | 4/1997 | Cluts | |
| 5,675,511 A | 10/1997 | Prasad et al. | 364/514 A |
| 5,717,869 A | 2/1998 | Moran et al. | 395/339 |
| 5,721,827 A | 2/1998 | Logan et al. | |
| 5,792,047 A * | 8/1998 | Coggins | 600/300 |
| 5,796,945 A * | 8/1998 | Tarabella | 709/219 |
| 5,801,694 A | 9/1998 | Gershen | 345/339 |
| 5,864,868 A | 1/1999 | Contois | 707/104 |
| 5,894,306 A | 4/1999 | Ichimura | 345/331 |
| 6,001,065 A * | 12/1999 | DeVito | 600/544 |
| 6,061,056 A * | 5/2000 | Menard et al. | 345/704 |
| 6,124,854 A * | 9/2000 | Sartain et al. | 715/716 |
| 6,505,160 B1 * | 1/2003 | Levy et al. | 704/270 |
| 6,545,209 B1 * | 4/2003 | Flannery et al. | 84/609 |
| 6,574,594 B1 * | 6/2003 | Pitman et al. | 704/236 |
| 6,647,389 B1 * | 11/2003 | Fitch et al. | 707/10 |
| 6,657,117 B1 * | 12/2003 | Weare et al. | 84/668 |
| 6,760,916 B1 * | 7/2004 | Holtz et al. | 725/34 |
| 2002/0008929 A1 * | 1/2002 | Montie et al. | 360/55 |
| 2002/0115937 A1 | 8/2002 | Song | |
| 2002/0132616 A1 * | 9/2002 | Ross et al. | 455/419 |
| 2004/0070594 A1 * | 4/2004 | Burke | 345/716 |

FOREIGN PATENT DOCUMENTS

| | | | |
|---|---|---|---|
| WO | WO 00/40021 | * | 7/2000 |
| WO | WO 01/03000 | | 1/2001 |

OTHER PUBLICATIONS

"Jukeboxes", Sep. 21, 1999, PC Magazine, 138, software review.*
Grant Du Bois, "Sites track down audio, video, more", Aug. 7, 2000, eWeek, v17, n32, p. 23(1).*

(Continued)

*Primary Examiner*—X. L. Bautista
(74) *Attorney, Agent, or Firm*—Chad W. Swantz; Suiter West Swantz PC LLO

(57) ABSTRACT

The present invention is directed to a system and method for classification of media content based upon user-defined classifications. A compilation of media content in conformity with the user-defined classifications and desired criteria may be automatically produced in accordance with the present invention. The system and method of the present invention may also be capable of selecting pieces of media content depending upon the user's mood and current activity.

9 Claims, 5 Drawing Sheets

OTHER PUBLICATIONS

Y. Li et al, "Video classification in user profile generation for personalized broadcast services", 2000, SPIT-Int. Soc. Opt. Eng., vol. 4310, p. 497-508.*

Kiyoko Yokoyama et al, "Human Interface for Heart Rate Control During Bicycle Ergometer Exercise", Sep. 2000, Kluwer Academic Publishers, , p. 377-88.*

The Music You Want, Where you Want it, When you Want it; http://www.audioramp.com/iRAD-S/overview.html.

About MusicMatch Jukebox; wysiwyg://109/http://www.musicmatch.com/jukebox; Jan 10, 2001.

Computer & Graphic 23 (1999) 893-901 IMC 98 / There is more to context than location/ Albreecht Schmidt, Michael Beigl, Hans-W. Gellersen Telecooperation Office (TecO), University of Karlsruhe, Vincenz-Priessnitz-Str.I, 76131 Karlsruhe, Germany.

Classification and Retrievel of Sound Effects in Audiovisual Data Mangaement Tong Zhang and C.-C. Jay Kuo / Integrated Media Systems Center and Department of Electrical Engineering-Systems University of Southern california, Los Angeles, CA 90089-2564/0-7803-5700-0/99.

Publication Date May 11, 1995 / Integrated Video Archive Tools Rune Hjelsvold, Stein Langorgen, Roger Midtstaum, Olav Sandsta / Department of Computer Sysstems and Telematics The Norwegian Institute of Technology / N-7034 Tronheim, Norway / pp. 283-293.

Affective Wearables / R.W. Picard, J. Healey MIT Media Laboratory, 20 Ames St., Cambridge, MA 01239 0-8186-8192-6/97.

XP-002199598 / 00-00-1999 / pp. 158-166 Recommender Systems in E-Commerce / J. Ben Schafer, Joseph Konstan, John Riedl GroupLens Research Project, Department of Computer Science and Engineering, Univ of MN, Minneapolis, MN 55455.

* cited by examiner

TAGGING CONTENT FOR DIFFERENT ACTIVITIES

FIELD OF THE INVENTION

The present invention relates generally to user-defined classification of media content and more specifically to a method of classifying content and assembling a compilation of media content based upon user-defined classifications.

BACKGROUND OF THE INVENTION

Through the proliferation of media content providers and the ability to retrieve and store media content, consumers now have the ability to create a library of media content. For example, audio may be converted to an MP3 format and may be stored on a hard drive of a personal computer. Audio files may also be downloaded from media content providers and also stored on a hard drive of a personal computer. However, when a consumer desires to listen to music, it may be burdensome to select specific audio files one by one.

Known to the art is the ability to store pre-classified media content. For example, audio files may be classified by the style of music. Audio files may be classified as rock, pop, country, and jazz. However, as consumers' tastes vary among styles of music, classification of audio files by style does not provide a mechanism for selecting and retrieving media content desired by each individual consumer.

Consequently, it would be advantageous if a system and method existed for user-defined classification of media content. As such, specific collections of media content could be created based upon user-defined classifications. Further, it would be advantageous if a compilation of media content could be created based upon user-defined classification of a library of content stored upon a system. It would also be advantageous if a system could select pieces of the media content from a library depending upon the user's activity, mood, and the like.

SUMMARY OF THE INVENTION

Accordingly, the present invention is directed to a system and method for classification of media content based upon user-defined classifications. The system and method of the present invention may be further capable of assembling arrangements of media content as desired by a user according to the user-defined classifications. The system and method of the present invention may also be capable of selecting pieces of media content in accordance with user-defined classifications depending upon the user's mood, activity, and the like.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made to a presently preferred embodiment of the invention, an example of which is illustrated in the accompanying drawings.

Figure 1:
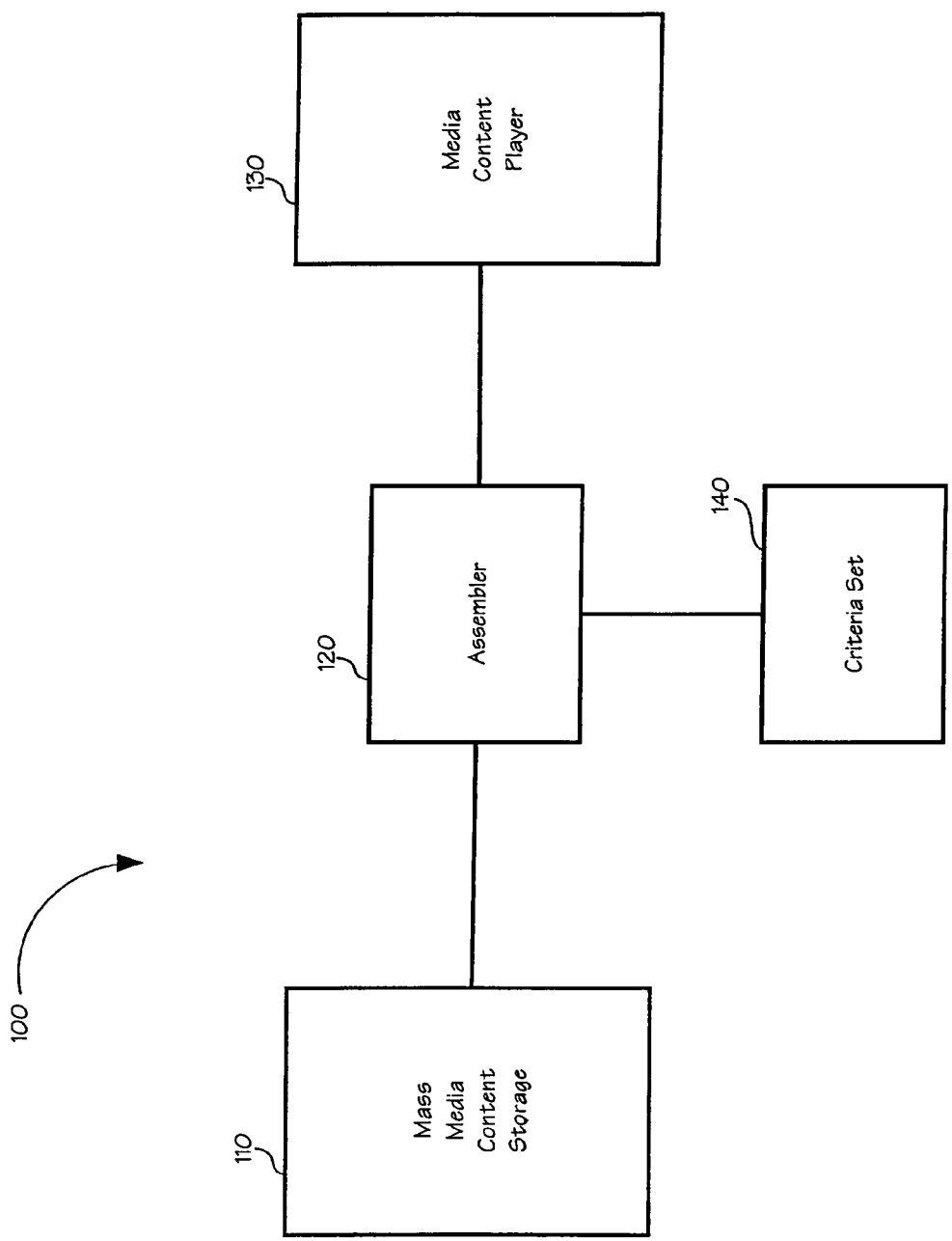
FIG. 1 depicts an embodiment of a content assembling system of the present invention.

Referring now to FIG. 1, an embodiment of the functional aspects of a content assembling system 100 of the present invention is shown. A library or collection of media content may be stored in mass media content storage 110. Mass media content storage 110 may be in the form of a hard drive of a computer, a server, a network, or a portable storage medium. Mass media content storage 110 may be capable of storing many pieces of media content, or files. Files may be in the form of videos, musical compositions, cartoons, and the like. For example, the mass media content storage 110 may be capable of storing mass quantities of audio files such as MP3 files.

The files of media content stored in mass media content storage may "tagged" with classifications created by a user. Tagging of a file may include classifying a file of media content in any way the user desires. The file itself may include a tag which may signify its classification. For example, a user may desire a particular style of music during exercise and may prefer another style of music when reading. Thus, the audio files a user likes to listen to when exercising may be tagged exercise and the audio files a user likes to listen to when reading may be tagged reading. A more thorough explanation of tagging will be presented in a discussion of FIG. 2.

An assembler 120 of the present invention may be capable of selecting files according to their tags and a desired criteria set 140. The assembler 120, in one embodiment, may be a program of instructions storable on a medium readable by an information handling system or an information appliance. A criteria set 140 may include a desired style of music for a prescribed period of time. For example, a user may desire a compilation of files from a group of files stored in mass media content storage 110 for exercising. The criteria set 140 in this example may be media content which has been classified as exercise. The assembler 120 of the present invention may be capable of selecting files of media content suitable for exercise for a prescribed period of time depending upon the criteria set 140. Assembler 120 may analyze files in mass media content storage 110 to retrieve files with exercise tags. In this method, a user may obtain a compilation of songs suitable for his or her activity. The compilation of files may be created to allow a media content player 130 to play the compilation of files.

The media content player 130 may be operably connected to the assembler 120 as part of a local network, or in another embodiment, included within an information handling system. For example, an information handling system itself may be utilized for creation and playback of a desired compilation of files. In an alternative embodiment, the compilation of files may be transferred via a hardwire or wireless connection to a remote media content player. Transfer of the compilation of files may be prior to or in real-time with playback of the compilation of files.

Figure 2:
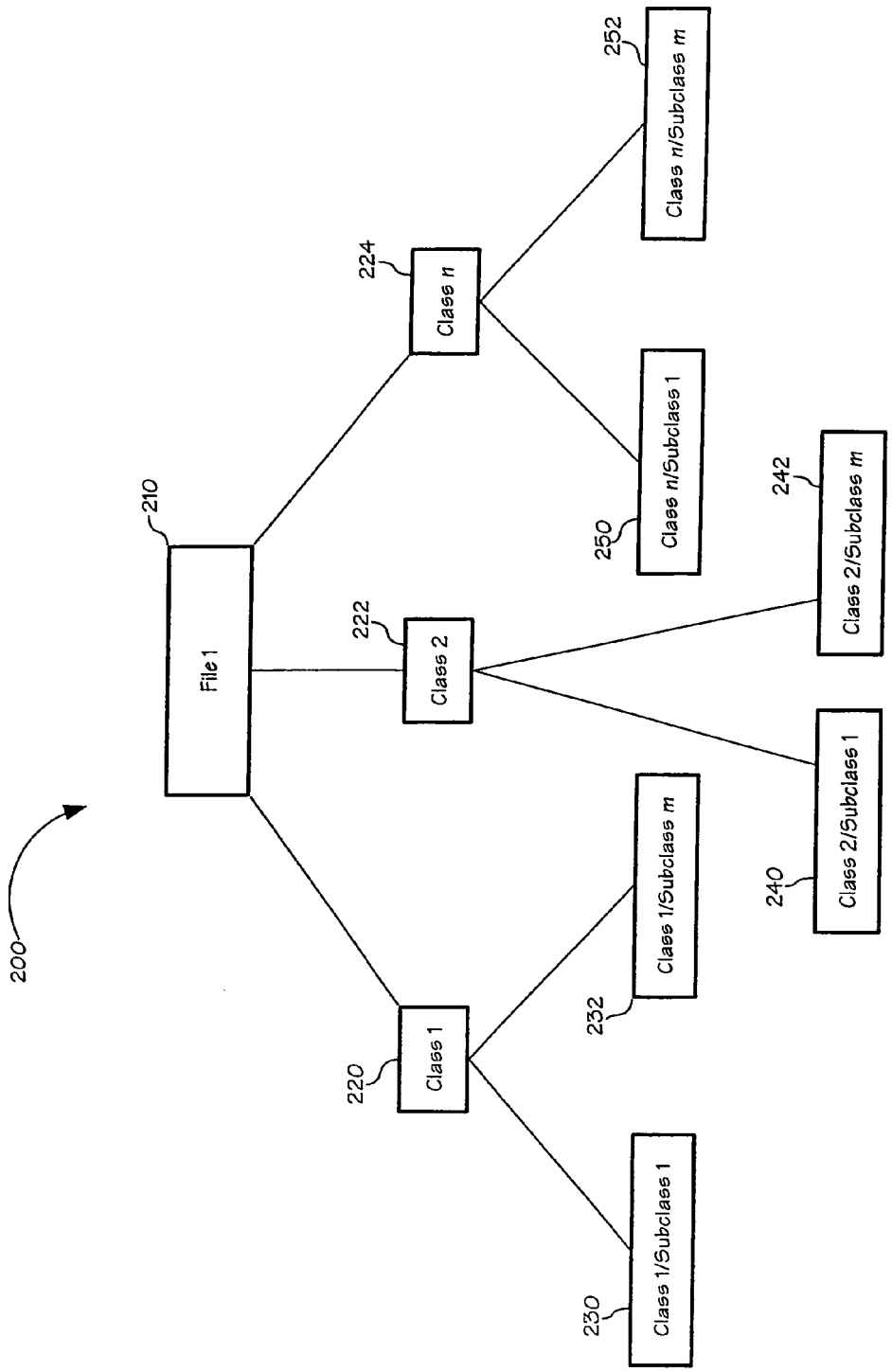
FIG. 2 depicts an exemplary embodiment of a classification system which can be created by a user in accordance with the present invention.

Referring now to FIG. 2, an exemplary embodiment of a tagging/classification system 200 in accordance with the present invention is shown. Tagging/classification system 200 may be utilized as a method of classifying and tagging a file for easier retrieval in accordance with the present invention. A file 210 may be stored on mass media content storage 110 of FIG. 1, and may be operated on by an assembler 120 according to criteria set 140.

File 210 of media content may be classified by a user into one of n classes 220-224. The file 210 may be played by media content player 130 according to a criterion or criteria specified in criteria set 140. For example, a particular file may be classified into one or more classes such as exercise, morning, and driving. Within each class, a file 210 may be further classified into one of several subclasses 230-232, 240-242, and 250-252 for each class. For example, within an exercise class, a file may be further classified into a warmup, aerobic, and weightlifting subclasses. In another example, tempo may be a class wherein subclasses may be slow, medium and fast. In an embodiment of the invention, it may be possible to form a criteria set such that the tempo begins from a slow tempo and ends with a fast tempo. Although not shown, further classification beyond a subclass level may be accomplished without departing from the scope and spirit of the present invention.

The assembler of the present invention as shown in FIG. 1 may review the classification of each file by the appropriate tagging. For example, a file 1 that has been classified into class 2, subclass 1 may be viewed by the assembler as file1/class2/subclass1. Further, it should be apparent that as multiple classification may be accommodated by a system of signifying multiple classification. In an exemplary embodiment, file 1 classified by class 1, subclass 1 and by class 2 may be signified by file1/class1/subclass1/class2. In this embodiment, a tag for class 1 subclass 1 and a tag for subclass 2 may be viewed by an assembler of the present invention. It should be apparent to a person of ordinary skill in the art that other methods of signifying the classification of a file are available which would not depart from the scope and spirit of the present invention.

In an alternative embodiment of the invention, a tag may include a rating for the particular piece of media content or a portion of a particular piece of media content. For example, the user could rate a given piece of media content as a five on a one to five scale with five being the best rating. The scale could be a rating for suitability for a given class. Utilizing an exercise class, a user could rate whether or not the media content was suitable for exercise. Rating of the music may be accomplished utilizing a remote media content player such as a portable MP3 player. This may ensure during the assembling process that the best media content for a desired activity is selected by a user.

Figure 3:
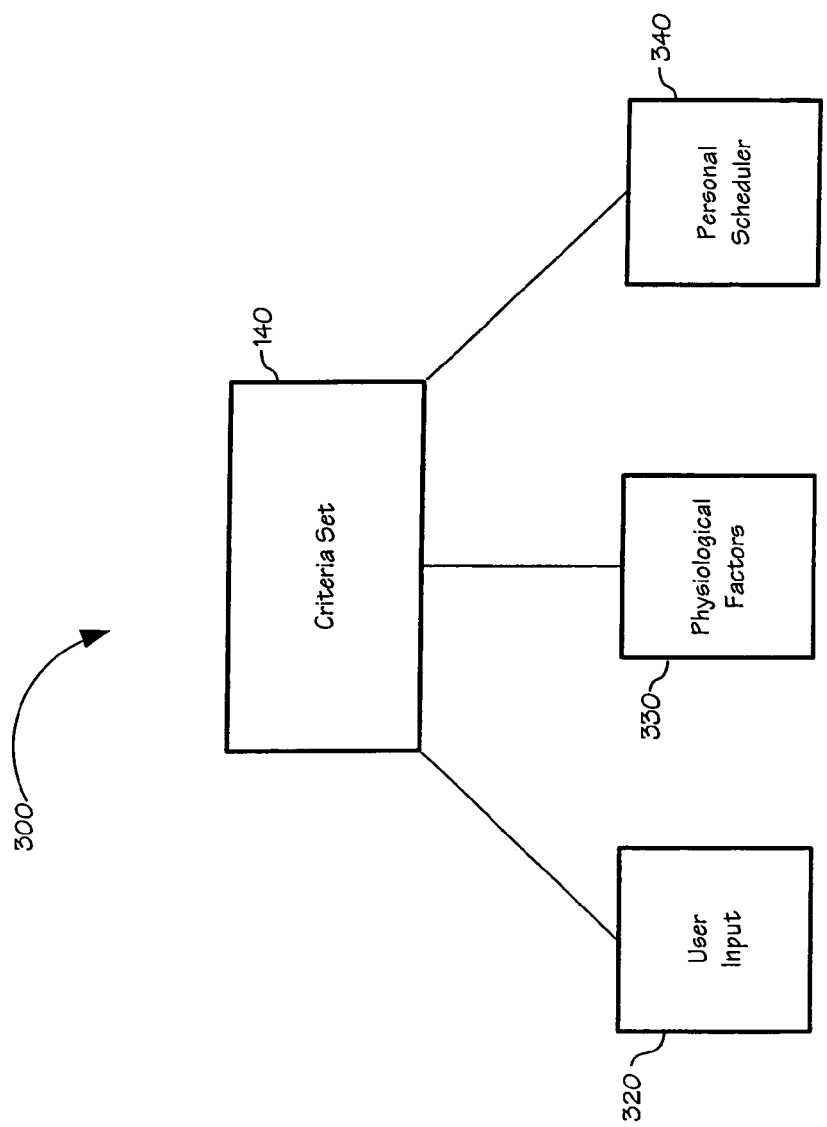
FIG. 3 depicts an exemplary embodiment of factors contributing to the creation of a desired criteria set for a content assembling system of the present invention.

Referring now to FIG. 3, a depiction of an exemplary embodiment of factors 300 contributing to the creation of a desired criteria set 140 for a content assembling system of the present invention is shown. A desired criteria set 140 may reflect a user's wishes for a compilation of media content. Included within a desired criteria set 140 may be the length of the compilation and style of the media content. For example, a user may desire an hour of audio files suitable for calming the user when driving in morning traffic. Thus, the criteria set 140 may include a time limitation of an hour and easy listening music. The assembler may review the criteria set to search and retrieve easy listening tagged audio files for an hour of listening.

One factor for creating a criteria set 140 is through user input 320. A user may simply input the length of the desired compilation and the desired classifications. Input may be through input controls on a remote media content player. In alternative embodiments, input may be accomplished through input devices connected to an information handling system.

Physiological factors 330 may also contribute as a factor in determining a criteria set 140. The content assembling system of the present invention may be capable of creating a compilation of media content dependent upon a user's mood or activity. For example, if a person is stressed or is tense, the content assembling system may be capable of providing a compilation of media content which may help the user relax. A heart rate monitor may be operably connected to a remote media content player or may be operably connected to a local network in which the remote content player is residing. If a person's heart rate is high, which may be a symptom of stress, the content assembling system of the present invention may assemble a compilation of files which may help the user relax. In another embodiment, a pedometer may be operably connected to a remote media content player or may be operably connected to a local network in which the remote content player is presiding. If the pedometer has not detected any movement, high tempo music may be assembled by the content assembling system of the present invention to encourage the user to engage in physical activity. Other types of physiological testing may be utilized by one of ordinary skill in the art for a determination of a user's mood and activity in accordance with the present invention without departing from the scope and spirit of the present invention.

A personal electronic scheduler 340 may contribute as a factor in determining a criteria set 140. For example, a person may have an exercise session scheduled from 7:00 PM to 8:00 PM on a particular evening. The content assembler system of the present invention may be capable of interfacing with the personal schedule. As a result, the content assembler system may know that a user is scheduled to exercise for an hour from 7:00 PM to 8:00 PM. The content assembler system may be capable of producing a compilation of content suitable for exercise for a user during the scheduled exercise session. In another example, a person may schedule an hour of reading. During this time, classical music may be desired by the user. The content assembler system of the present invention may select audio files tagged with a classical classification.

Based upon the electronic schedule of a user, the content assembler system of the present invention may know the location of a user. If a person generally reads at the library, the content assembler system may compile soft, slow music. In an alternative embodiment, the content assembler system may know the location of the user through other means. An example of a location descriptor may be a Global Positioning System (GPS) receiver. With a GPS receiver, the content assembler system may account for the user's location and compile content suitable for the user's current location.

Figure 4:
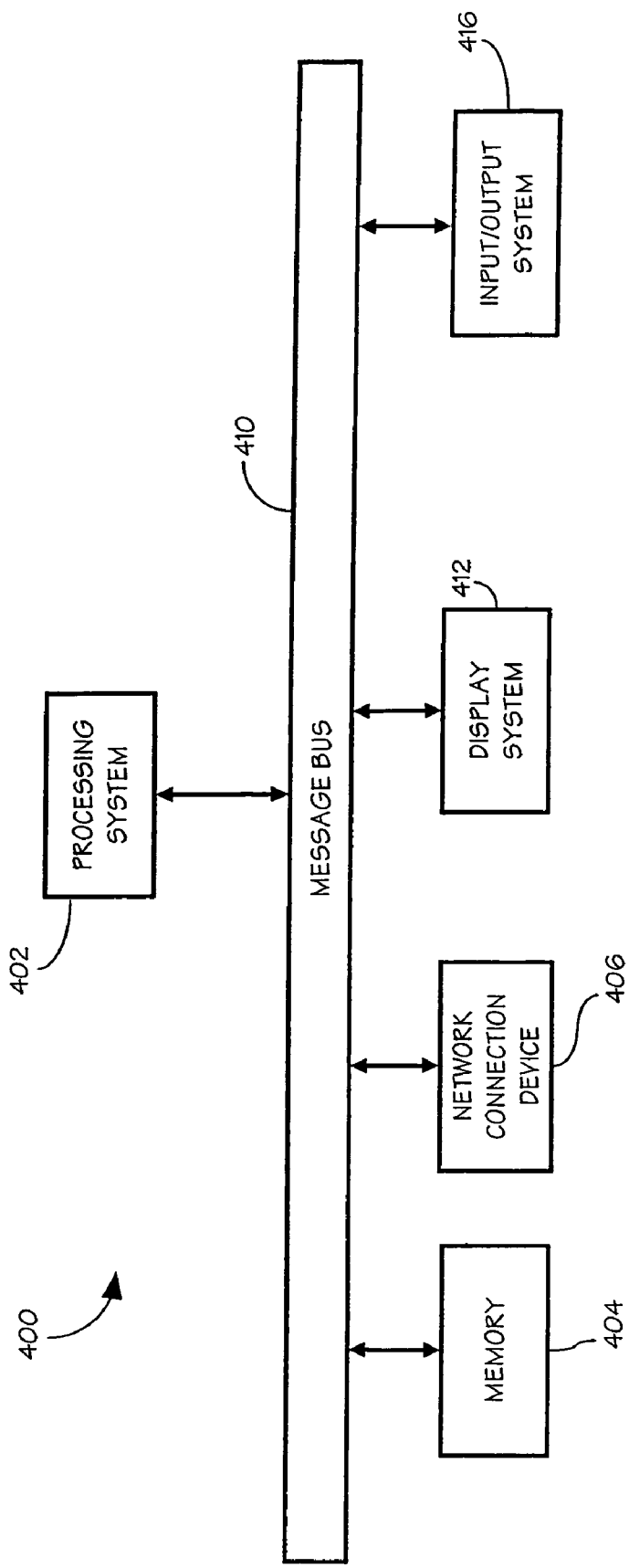
FIG. 4 is a block diagram of an information handling system of the present invention.

Referring now to FIG. 4, a hardware system in accordance with the present invention is shown. The hardware system shown in FIG. 4 is generally representative of a preferred hardware architecture of an information handling system 400 of the present invention. A controller, for example, a processing system 402, controls the information handling system 400. The processing system 402 includes a central processing unit such as a microprocessor or microcontroller for executing programs, performing data manipulations and controlling the tasks of the information handling system 400. Communication with the processing system 402 may be implemented through a message or system bus 410 for transferring information among the devices of the information handling system 400. The system bus 410 may include a data channel for facilitating information transfer between storage and other peripheral devices of the information handling system 400. The system bus 410 further provides the set of signals required for communication with processing system 402 including a data bus, address bus, and control bus. The system bus 410 may comprise any state of the art bus architecture according to promulgated standards, for example industry standard architecture (ISA), extended industry standard architecture (EISA), Micro Channel Architecture (MCA), peripheral device interconnect (PCI) local bus, standards promulgated by the Institute of Electrical and Electronics Engineers (IEEE) including IEEE 488 general-purpose interface bus (GPIB), IEEE 696/S-600, and so on. Furthermore, the system bus 410 may be compliant with any promulgated industry standard. For example, the system bus 410 may be designed in compliance with any of the following bus architectures: Industry Standard Architecture (ISA), Extended Industry Standard Architecture (EISA), Micro Channel Architecture, Peripheral Device Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI), as examples.

Additionally, the information handling system 400 includes a memory 404. In one embodiment, memory 404 is provided on SIMMs (Single In-line Memory Modules), while in another embodiment, memory 404 is provided on DIMMs (Dual In-line Memory Modules), each of which plugs into suitable sockets provided on a motherboard holding many of the other devices shown in FIG. 4. Memory 404 includes standard DRAM (Dynamic Random-Access Memory), EDO (Extended Data Out) DRAM, SDRAM (Synchronous DRAM), or other suitable memory technology. Memory 404 may also include auxiliary memory to provide storage of instructions and data that are loaded into the memory 404 before execution. Auxiliary memory may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM).

The information handling system 400 may include a network connection device or a network interface 406. The network interface 406 communicates between the information handling system 400 and a remote device, such as external devices, networks, information sources, or host systems that administer a plurality of information appliances. For example, host systems such as a server or information handling system, may run software controlling the information handling system 400, serve as storage for an information handling system 400, or coordinate software running separately on each information handling system 400. The network interface 406 may provide or receive analog, digital, or radio frequency data. The network interface system 406 preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and Universal Serial Bus (USB), as examples. For example, the network interface system 406 may comprise a network adapter, a serial port, parallel port, printer adapter, modem, universal asynchronous receiver-transmitter (UART) port, etc., or use various wireless technologies or links such as an infrared port, radio-frequency (RF) communications adapter, infrared transducers, or RF modem.

The information handling system 400 may preferably include a display system 412. This may allow for a generation of a display when an information handling system 400 is connected to a display device. The display system 412 may comprise a video display adapter having all of the devices for driving the display device, including video random access memory (VRAM), buffer, and graphics engine as desired. A display device may comprise a liquid-crystal display (LCD), or may comprise alternative display technologies, such as a light-emitting diode (LED) display, gas or plasma display, or employ flat-screen technology.

An information handling system 400 may further include an input/output (I/O) system 416. This may allow for user input via I/O devices when I/O devices are connected to information handling system 400. Input/output system 416 may comprise one or more controllers or adapters for providing interface functions between one or more I/O devices. For example, input/output system 416 may comprise a serial port, parallel port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. It should be appreciated that modification or reconfiguration of the information handling system 400 of FIG. 4 by a person of ordinary skill in the art would not depart from the scope or the spirit of the present invention.

Assembler 120 as shown in FIG. 1 may be implemented as a computer program executed by processing system 402 to operate on file 210 and criteria set 140. Mass media content storage 110 may be coupled to processing system 402 via message bus 410. Media content player 130 may be tangibly implemented by information handling system directly, for example, where processing system 402 decodes file 210 and plays the media file via input/output system 416. Such an embodiment may be a desktop or a laptop computer having integrated speakers or an analog or digital output receptacle for coupling to a device capable of reproducing the media, such as a stereo system, networked music player and the like.

In a similar embodiment, information handling system 400 may implement a stand-alone media player that may include all of the elements of FIGS. 1, 2, and 3 in a single device which may be optionally portable and battery powered. In an alternative embodiment, information handling system 400 may implement one or more items 110, 129, and 140 in a first device, where media content player 130 is a separate device that can couple to information handling system 400. In such an embodiment, information handling system may perform longer term storage and processing of file 210 whereas media content player may perform shorter term storage and playing of file 210.

Figure 5:
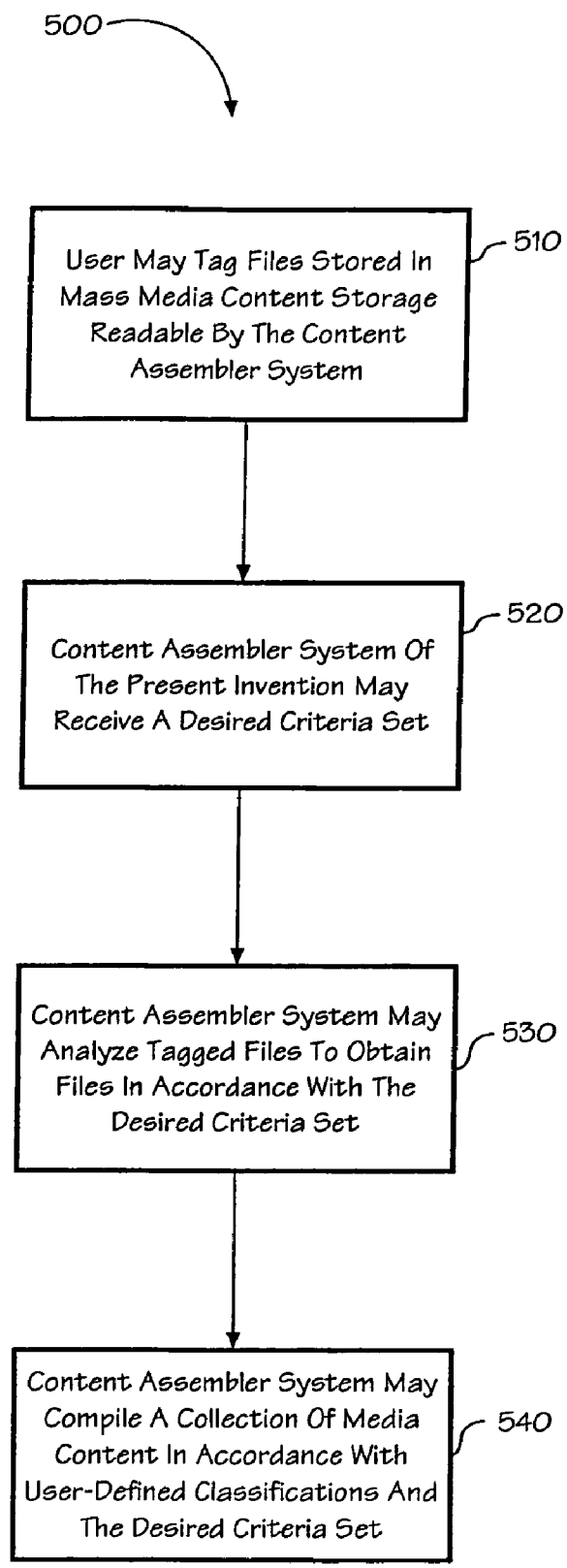
FIG. 5 depicts an embodiment of a flow chart representing a process in accordance with the present invention.

Referring now to FIG. 5, an embodiment of a flow chart representing a process in accordance with the present invention is shown. The process may begin by allowing a user to tag files stored in mass media content storage 110 of FIG. 1 in accordance with the user's classifications 510. The tags of the files stored in mass media content storage may be readable by the content assembling system as described in FIGS. 1–4. The content assembling system of the present invention may receive a desired criteria set 520. Formulation of the criteria set may include one or several of the factors as described in FIG. 3.

Upon receipt of a criteria set, the content assembling system of the present invention may analyze the tagged files to obtain files which may be in accordance with the desired criteria set 530. For example, if the desired criteria set is music for exercise, then the content assembling system may search a mass media content storage for files which have been tagged exercise. The content assembling system may then compile a collection of media content in accordance with the user-defined classifications and the desired criteria set. The collection of media content compiled may also reflect the user's ratings and may fit within a desired duration.

Although the invention has been described with a certain degree of particularity, it should be recognized that elements thereof may be altered by persons skilled in the art without departing from the spirit and scope of the invention. It is believed that the method and system for the present invention and many of its attendant advantages will be understood by the foregoing description, and it will be apparent that various changes may be made in the form, construction, and arrangement of the components thereof without departing from the scope and spirit of the invention or without sacrificing all of its material advantages, the form hereinbefore described being merely an explanatory embodiment thereof. It is the intention of the following claims to encompass and include such changes.

What is claimed is:

1. A content assembling system, comprising:
   a media content storage device;
   means for identifying a piece of media content located in said media content storage device, said identifying means being capable of displaying a user-defined classification;
   means for receiving a criteria set, said criteria set including said at least one user-defined classification and a time period; and
   means for assembling a compilation of media content; wherein said assembling means is capable of searching said media content storage device for media content in conformance with said criteria set by analyzing said identifying means,
       wherein said means for receiving a criteria set includes information from at least one physiological input, said at least one physiological input including a heart rate counter and motion detection, and said lime period refers to a duration of said collection of media content.

2. The system as claimed in claim 1, wherein said media content storage device is at least one of a hard drives a server, or a portable storage medium.

3. The system as claimed in claim 1, wherein said identifying means includes a tag capable of describing at least one attribute of said piece of media content.

4. The system as claimed in claim 1, wherein said receiving means may include information from at least one of a user input or a personal scheduler.

5. The system as claimed in claim 1, wherein said piece of media content is an audio file.

6. The system as claimed in claim 5, wherein said audio file is in an MP3 format.

7. The system as claimed in claim 1, further comprising means for playing said media content operably connected to said assembling means.

8. The system as claimed in claim 7, wherein said playing means is a remote media content player.

9. The system as claimed in claim 8, wherein said remote content player is capable of allowing a user to rate a piece of media content included within said compilation.

* * * * *